(12) United States Patent
Park

(10) Patent No.: US 6,775,784 B1
(45) Date of Patent: Aug. 10, 2004

(54) POWER SUPPLY CONTROL CIRCUIT AND METHOD FOR CUTTING OFF UNNECESSARY POWER TO SYSTEM MEMORY IN THE POWER-OFF STATE

(75) Inventor: Seong-Geun Park, Sungnam-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 578 days.

(21) Appl. No.: 09/694,311

(22) Filed: Oct. 24, 2000

(30) Foreign Application Priority Data

Oct. 25, 1999 (KR) .................................... 1999-46418

(51) Int. Cl.[7] ................................................ G06F 1/26
(52) U.S. Cl. .................... 713/320; 713/323; 713/324
(58) Field of Search ................................ 713/300, 310, 713/323, 324, 330, 320

(56) References Cited

U.S. PATENT DOCUMENTS

| | | | |
|---|---|---|---|
| 4,365,290 A | | 12/1982 | Nelms et al. |
| 5,167,024 A | | 11/1992 | Smith et al. |
| 5,239,652 A | | 8/1993 | Seibert et al. |
| 5,262,998 A | * | 11/1993 | Mnich et al. ............... 365/222 |
| 5,375,247 A | * | 12/1994 | Hueser ....................... 713/330 |
| 5,384,721 A | | 1/1995 | Joto |
| 5,396,635 A | | 3/1995 | Fung |
| 5,414,861 A | * | 5/1995 | Horning ..................... 365/229 |
| 5,483,464 A | | 1/1996 | Song |
| 5,590,342 A | | 12/1996 | Marisetty |
| 5,737,616 A | | 4/1998 | Watanabe |
| 5,781,782 A | * | 7/1998 | Tachikawa .................. 713/330 |
| 5,796,992 A | | 8/1998 | Reif et al. |
| 5,919,264 A | | 7/1999 | Reneris |
| 5,987,613 A | | 11/1999 | Busch et al. |
| 6,006,335 A | * | 12/1999 | Choi et al. .................. 713/310 |
| 6,016,548 A | | 1/2000 | Nakamura et al. |
| 6,058,039 A | * | 5/2000 | Abe et al. .................... 365/52 |
| 6,098,174 A | * | 8/2000 | Baron et al. ................. 713/300 |
| 6,105,142 A | * | 8/2000 | Goff et al. ................... 713/324 |
| 6,128,744 A | | 10/2000 | Wang |
| 6,128,747 A | * | 10/2000 | Thoulon ...................... 713/330 |
| 6,260,151 B1 | * | 7/2001 | Omizo et al. ............... 713/324 |
| 6,266,776 B1 | * | 7/2001 | Sakai .......................... 713/300 |
| 6,324,651 B2 | * | 11/2001 | Kubik et al. ................ 713/323 |
| 6,360,327 B1 | * | 3/2002 | Hobson ....................... 713/300 |
| 6,389,556 B1 | * | 5/2002 | Qureshi ........................ 714/15 |
| 6,523,128 B1 | * | 2/2003 | Stapleton et al. ........... 713/330 |

FOREIGN PATENT DOCUMENTS

GB  2277822 A  * 11/1994

OTHER PUBLICATIONS

"Power Reduction for Active FET Inverters", IBM Technical Disclosure Bulletin, Nov. 1984, vol. 27 pp 3461–3462.*

* cited by examiner

Primary Examiner—Thomas Lee
Assistant Examiner—Chun Cao
(74) Attorney, Agent, or Firm—Robert E. Bushnell, Esq.

(57) ABSTRACT

In a computer system having a plurality of power management states, a power management control circuit includes a power management controller which manages power in accordance with the Advanced Configuration and Power Interface (ACPI) power management scheme, and includes a switching circuit that supplies a main power or a standby power to a system memory for the computer system according to a control of the power management controller. When a system state of the computer system is converted into the soft off state of the ACPI power management scheme, the power management controller cuts off power supplied to the system memory for the computer system. Therefore, it is possible to prevent unnecessary power consumption and damage to the system memory and to peripheral circuits when the system memory is removed or mounted from or upon a main board for the computer system.

18 Claims, 2 Drawing Sheets

POWER SUPPLY CONTROL CIRCUIT AND METHOD FOR CUTTING OFF UNNECESSARY POWER TO SYSTEM MEMORY IN THE POWER-OFF STATE

CLAIM OF PRIORITY

This application makes reference to, incorporates the same herein, and claims all benefits accruing under 35 U.S.C. § 119 from an application entitled POWER SUPPLY CONTROL CIRCUIT FOR COMPUTER SYSTEM HAVING A PLURALITY OF POWER MANAGEMENT STATES earlier filed in the Korean Industrial Property Office on the 25$^{th}$ day of October 1999, and there duly assigned Serial No. 99-46418.

FIELD OF THE INVENTION

The present invention relates to a power supply control circuit for a computer system and, more particularly, to a power supply control circuit for controlling power supplied to a computer system according to a plurality of power management states of the computer system.

BACKGROUND OF THE INVENTION

As the number of components increases with a variety of computer functions, a computer system tends to consume great amounts of power. To reduce power consumption, various components of a computer system can be placed into a variety of different power states with differing levels of power consumption. For example, video output from a computer system, processor operation, and hard disk drive rotation can be deactivated during periods of system inactivity.

One known advanced power management technique is the Advanced Power Management (APM), which has been implemented by basic input-output system (BIOS) instructions. The APM is described in detail in the Advanced Power Management BIOS Interface Specification, Revision 1.2, dated on February 1996. In accordance with the specification, the BIOS, through operating system transparent system management interrupts (SMIs), monitors power managed devices and notifies the operating system when it is time to put the system to sleep. The operating system, in turn, notifies its device drivers of the impending power state change so they can perform an orderly shutdown of their respective devices. Following the device driver operations, control is returned to the BIOS which then performs any hardware specific duties necessary to put the system to sleep. In waking from a sleep state, the system BIOS first receives control so that it can configure system hardware for returning the system to a working state. Only after the BIOS performs its configuration tasks is control returned to the operating system.

A more sophisticated advanced power management scheme is the Advanced Configuration and Power Interface (ACPI), which is described in the Advanced Configuration and Power Interface Specification, Revision 1.0, dated on Dec. 22, 1996. Also, examples of ACPI supporting computer systems are described in, for example, U.S. Pat. No. 5,919,264 entitled System And Method For Using Data Structures To Share A Plurality Of Power Resources Among A Plurality Of Devices, to Reneris, U.S. Pat. No. 5,919,264 being incorporated herein by reference.

Under the ACPI power management scheme, when a power management or configuration event occurs, an operating system is notified via an 'operating system visible interrupt' known as a 'system control interrupt (SCI)'. Also, it is the operating system itself that directs all system and device power state transitions. The ACPI specification defines six "sleep" states S0 through S5. In the S0 state, also known as the working state G0, the computer system is fully on and operational, consuming maximum power. In the S5 state, also known as the soft-off state, the computer system consumes a minimal amount of power. No code is executed in the computer system, almost all devices are inactive, and the computer system awaits a wakeup event to transition the computer system to a higher activity state. Awakening from the soft-off state typically requires a complete boot of the computer system because no system context is saved prior to entering the S5 state. The sleep states between the S0 state and the S5 state each specify varying amounts of component activity and, therefore, varying amounts of power consumption. Thus, the S1 state through the S4 state have differing wakeup latency times depending upon which devices are inactive, how much computer system context was saved prior to entering the sleep state, and other factors.

A computer system with such an ACPI power management scheme supports the ATX specification that has been written as a specification for the personal computer (PC) industry to build products more cheaply, improve ease of use and serviceability, and to incorporate new and exciting input/output (I/O) features with ease. In accordance with the ATX specification, a power management controller of a computer system is always supplied with standby power. Particularly, the sleep S3 state of the ACPI power management scheme is a low wake-up latency sleeping state, whereby all system context are lost except the system memory and the power management controller. Also, the context of the CPU (Central Processing Unit), cache, and other chipsets are lost in this state.

A procedure in which a computer system enters the S3 state of the ACPI power management scheme is usually called a "suspend-to-random access memory (RAM)", in which system context is stored in a system memory. Because general booting procedures are skipped in a resume operation when a computer system returns from the sleep S3 state to the working S0 state, a user can quickly utilize the computer system.

Also, a computer system supporting the ACPI power management scheme typically has a power switch, or so-called soft switch, which is used to transition a computer system to the S3 state and the S5 state. If the soft switch is on within a predetermined time, the system enters the S3 state. If the soft switch is on over the predetermined time, the system state switches to the S5 state. These soft switch functions can be set active or inactive using the complimentary metal oxide semiconductor (CMOS) setup utility of a BIOS.

However, in an ACPI power management scheme supporting a computer system, the system memory is typically supplied with standby power in both the S3 state and the S5 state. Although the S5 state is substantially identical to the power-off state, a user cannot replace the system memory with a new system memory in the S5 state because the standby power is still supplied to the system memory.

U.S. Pat. No. 4,365,290 to Nelms et al., entitled Computer System with Power Control Circuit, discloses a digital computer system including a power control circuit for selectively controlling the drain imposed upon the energy source in accordance with the data input into the system and the program executed by the processor. The power control circuit is operative in at least three modes of operation, namely off/rest, power down, and operating. In the off/rest mode, the power control circuit imposes a minimum power drain upon the depletable energy source. An operator can manipulate a switch or actuation means to apply a transition signal to the power control, whereby the computer system is transitioned from its off/rest mode to its power down mode. In the power down mode, the control circuit applies power at an intermediate level to the data input means.

U.S. Pat. No. 5,167,024 to Smith et al. entitled Power Management for a Laptop Compute with Slow and Sleep Modes, discloses a power manager within a portable laptop computer that provides power and clocking control to various units within the computer in order to conserve battery power. Transistor switches controlled by the power manager control the distribution of power and/or clock signals to the various units within the computer. The power manager includes a software routine for continually monitoring the various units and, when these units are either not needed and/or not currently in use, power and/or clock signals are removed from a given unit.

U.S. Pat. No. 5,239,652 to Seibert et al., entitled Arrangement For Reducing Computer Power Consumption by Turning Off The Microprocessor When Inactive, discloses a power consumption reduction method and apparatus for a computer. The operating system running on the CPU of the computer determines when the CPU is not actively processing and generates a power-off signal to a control logic circuit. The control logic circuit then disconnects the CPU from the power supply. Pulses sent by a periodic timer or interrupts from input/output units are applied to the control logic circuit to at least periodically issue a power-on signal to the CPU. Power is supplied to the CPU for a given time period at every power-on signal. The control logic circuit also determines, at every power-on signal, whether the CPU is already on or being turned off.

U.S. Pat. No. 5,384,721 to Joto, entitled Information Processing System With A Power Control Unit, discloses an information processing system for processing an application program that provides a power control unit being operated in a run mode during which the system is powered, and a standby mode during which part of the system is powered. The system further includes functions of inputting any key on a keyboard into an application program, transferring the run mode to the standby mode by pressing a special key on the keyboard, transferring the standby mode to the run mode by pressing any key on the keyboard, detecting when no key input takes place for a certain interval of time, and transferring to the standby mode when the detecting means does not detect any occurrence of a key input for a constant time during the run mode.

U.S. Pat. No. 5,396,635 to Fung, entitled Power Conservation Apparatus Having Multiple Power Reduction Levels Dependent Upon The Activity Of The Computer System, discloses a power conservation system in a computer system which includes a processing unit operating under control of an operating system. The computer system generates distinct call functions to the operating system where each call function is either in an active class or an idle class. The power conservation system has a plurality of states of operation including an ON state, a DOZE state, a SLEEP state and an OFF state. An activity monitor monitors the activity of the computer system and generates control signals for selecting one of the states of operation for the computer system.

U.S. Pat. No. 5,483,464 to Song, entitled Power Saving Apparatus For Use In Peripheral Equipment Of A Computer, discloses an apparatus for use in the peripheral equipment of a computer that reduces consumption of power. Once it has been determined that the computer has not been used for a predetermined period of time, an operation control signal indicative of a specific control mode is supplied for controlling the supply of power to the computer's peripheral equipment and the computer's operating state. The operation of a power supply means for generating operating power to a computer's peripheral equipment is controlled in response to a detected control mode. Accordingly, energy is conserved by controlling the supply of power and the operating state of a computer's peripheral equipment according to the peripheral equipment's operational state.

U.S. Pat. No. 5,590,342 to Marisetty, entitled Method And Apparatus For Reducing Power Consumption In A Computer System Using Virtual Device Drivers, discloses a power management mechanism for use in a computer system having a bus, a memory for storing data and instructions, and a central processing unit (CPU). The CPU runs an operating system having a power management virtual device driver (PMVxD) responsible for performing idle detection for devices. The PMVxD performs idle detection using event timers that provide an indicator as to the activity level. The PMVxD places idle local devices in a reduced power consumption state when no activity has occurred for a predetermined period of time.

U.S. Pat. No. 5,737,616 to Watanabe, entitled Power Supply Circuit With Power Saving Capability, discloses a power supply circuit for saving electric energy consumed by a central processing unit and a peripheral assembly through coordination between power supply modes of the central processing unit and the peripheral assembly. The central processing unit has a register for establishing a status of an internal power supply of the central processing unit, a first mechanism for changing the internal power supply into the status established by the register, and a second mechanism for outputting a status signal indicative of the status. The peripheral assembly has a peripheral circuit, a peripheral device, and a power supply control block for changing power supply statuses and clock statuses of the peripheral circuit and the peripheral device based on the status signal output from the second mechanism.

U.S. Pat. No. 5,796,992 to Reif et al., entitled Circuit For Switching Between Synchronous And Asynchronous Memory Refresh Cycles In Low Power Mode, discloses a power management circuit for managing low power modes in a computer system, which implements four power modes, from highest power consumption to lowest power consumption: RUN mode, SLEEP mode, IDLE mode, and STANDBY mode.

U.S. Pat. No. 5,919,264 to Reneris, entitled System And Method For Using Data Structures To Share A Plurality Of Power Resources Among A Plurality Of Devices, discloses sharing a plurality of power resources among a plurality of devices using a set of data structures. Power dependencies are identified using a power management data structure defining which power resources must be on to support the device in a device state, and a system state data structure defining which power resources must be off in a corresponding system state. These data structures are used by the operating system when a desired device state for a device is selected.

U.S. Pat. No. 5,987,613 to Busch et al., entitled Portable Computer With Time-Sensitive Tri-Modal Power Management Switch, discloses a portable computer in which a single switch is positioned to be closed when the case is closed, and also to be readily operable by the user's finger. Software polls the switch. If the switch is briefly depressed, the software detects that the user is requesting entry into a standby mode, and accordingly powers down certain input/output functions until new stimulus is received. If the switch is held down for a long time by the user closing the case cover, or manually holding the button down for a long time, the software causes the system to enter a sleep mode, its lowest power mode.

U.S. Pat. No. 6,016,548 to Nakamura et al., entitled Apparatus For Controlling Duty Ratio Of Power Saving Of CPU, discloses a computer system capable of entering a sleep mode. The rate at which the computer switches between a normal state and a stop grant state while in the sleep mode is controllable by a timer. The stop grant state is disclosed as an intermediate power consumption state between the sleep mode and the normal state.

U.S. Pat. No. 6,128,744 to Wang, entitled Computer Starter And Starting Method For An ATX Computer System, discloses a computer starter and starting method for an ATX computer system which provides a standby voltage when the computer system is shut down. The computer starter takes the standby signal as its power supply and includes a smart card interface, a clock generator, a non-volatile memory, a micro-controller and a power control circuit. The smart card interface generates an enable signal upon insertion of a smart card.

SUMMARY OF THE INVENTION

Therefore, it is an object, among other objects, of the present invention to provide a power supply control circuit for an ACPI (Advanced Configuration and Power Interface) power management scheme supporting a computer system, which is capable of reducing power consumption.

It is another object of the present invention to provide a power supply control circuit for an ACPI power management scheme supporting a computer system, which permits the substitution of the system memory with a new system memory in the soft off or power off state of the ACPI power management scheme by cutting off an unnecessary supply of power to the system memory.

According to one aspect of the present invention, a power supply control circuit is used for a computer system with a plurality of power management states including a normal state, a sleep state, and a power-off state. The power supply control circuit includes a power supply, a power management controller, and a switching circuit. The power supply supplies a main power and a standby power. The power management controller, which is operated by receiving the standby power, controls the power supply to output the main power in the normal state and selectively outputs a plurality of system state display signals according to the plurality of the power management states. The switching circuit receives the main power and the standby power, and the switching circuit supplies the main power to a volatile system memory when a system state display signal of the plurality of system state display signals displays the normal state. When a system state display signal of the plurality of system state display signals displays the power-off state, the switching circuit cuts off the standby power supplied to the system memory. In the sleep state, a system context is stored and held in the system memory.

The switching circuit includes a first switch, a second switch, and a switch driver. The first switch is located between a power supply for the standby power and the system memory. The second switch is located between a power supply for the main power and the system memory. The switch driver receives a system state display signal of the plurality of system state display signals. The switch driver selectively switches on the second switch when a system state display signal of the plurality of system state display signals displays the normal state. The switch driver selectively switches on the first switch when a system state display signal of the plurality of system state display signals displays the sleep state, and the switch driver selectively switches off the first switch and the second switch when a system state display signal of the plurality of system state display signals displays the power-off state. The switching circuit further includes a regulator located between the power supply for the standby power and the first switch.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein.

DESCRIPTION OF THE PREFERRED EMBODIMENTS

A power management control circuit includes a power management controller for managing power according to the ACPI power management scheme, and a switching circuit for supplying a main power or a standby power to a system memory according to the control of the power management controller. When an ACPI power management scheme for a computer system transitions to the S5 state, or the soft off state of the ACPI power management scheme, the power management controller cuts off power supplied to the system memory to suppress unnecessary power consumption. When the system memory is removed or mounted from or upon a main board for the computer system, the power management controller functions to prevent damage to the system memory and to peripheral circuits of the computer system.

Figure 1:
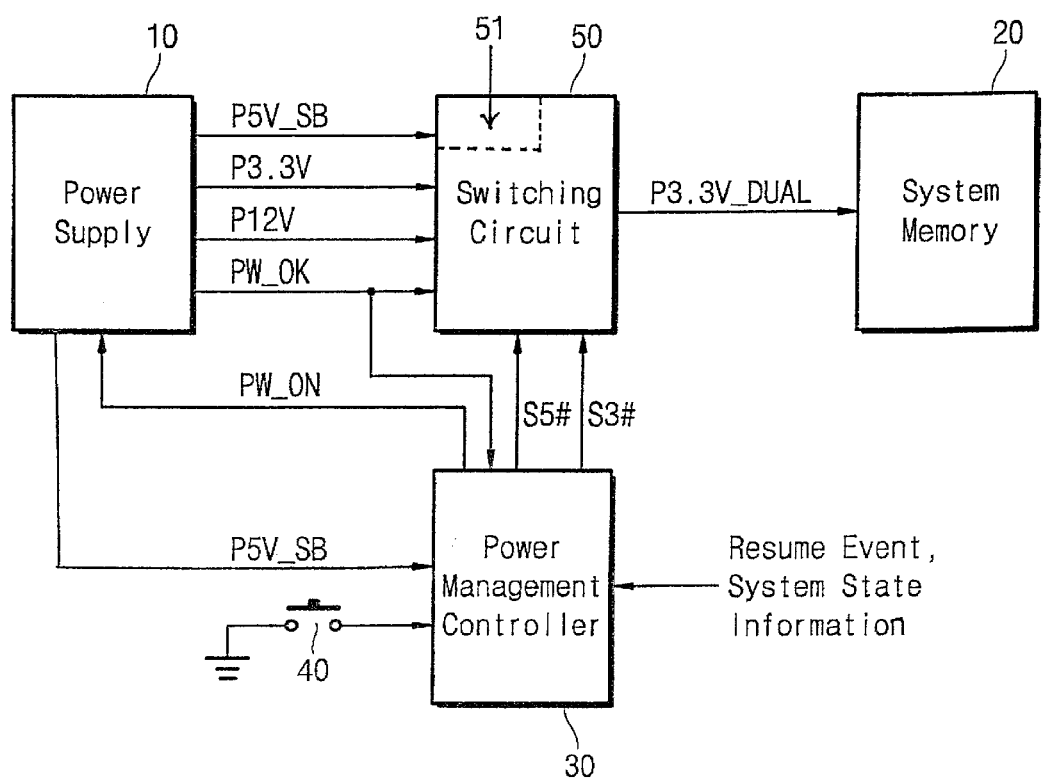
FIG. 1 is a block diagram schematically showing a power supply control circuit according to the present invention.

FIG. 1 schematically illustrates a configuration of a power supply control circuit for a computer system according to the present invention. Referring to FIG. 1, the power supply control circuit includes a switching circuit 50 that receives power from a power supply 10, and also includes a power management controller 30 that receives power from the power supply 10 and is coupled to the power supply 10 and to the switching circuit 50. Power supply 10 is a power supply of a computer system that supports the ATX specification. The power supply 10 receives external commercial alternative power, and outputs a main power such as, for example, 5 volts (V), −5V, 12V, −12V, and 3.3V, and outputs a standby power of 5V, for example. When 3.3V and 5V outputs are higher than an under-voltage threshold, the power supply 10 outputs a power good signal PW_OK of a high level to the switching circuit 50 and the power management controller 30. As understood by those skilled in the art, if the power supply 10 is applied to a portable computer, power supply 10 receives power from an alternating current (AC) adapter or a battery, and then selectively outputs a main power and a standby power.

Continuing with reference to FIG. 1, power management controller 30 is operated by receiving standby power P5V_

SB supplied from the power supply 10. Accordingly, while the power supply 10 receives external commercial power, the power management controller 30 can always be operated by receiving the standby power P5V_SB. The power management controller 30 can include a system power management logic that is built in, such as an Intel PIIX4 chipset supporting the ACPI power management scheme. As understood by those skilled in the art, the power management controller 30 supporting the ACPI power management scheme controls the power supply 10 of a computer system based upon input of a power button switch 40, various resume events, and system state information.

When the power button switch 40 is input for converting a system state into a normal state or a resume event occurs, the power management controller 30 inputs a power-on signal PW_ON of a high level to the power supply 10. The power supply 10 then outputs the main power in response to an input of the power-on signal PW_ON of the high level, and the power supply 10 outputs a power good signal PW_OK to the switching circuit 50 and to the power management controller 30 of a high level when 3.3V and 5V outputs are higher than the under-voltage threshold. If the power button switch 40 for transitioning the computer system to the S3 state or the S5 state of the ACPI power management scheme is input or system state information for switching the computer system to the S3 state or the S5 state is input to the power management controller 30, the power management controller 30 outputs a power-on signal PW_ON of a low level to the power supply 10 and the power management controller 30 also outputs a corresponding system state display signal S3# and a corresponding system state display signal S5#.

Continuing with reference to FIG. 1, switching circuit 50 is located between the power supply 10 and a system memory 20 for the computer system, such as or including a volatile system memory. The switching circuit 50 selectively receives 3.3V main power P3.3V and 5V standby power P5V_SB from the power supply 10, and the switching circuit 50 then supplies a suitable 3.3V dual power P3.3V_DUAL to the system memory 20. When the computer system is in the S3 state, the switching circuit 50 converts 5V standby power P5V_SB into 3.3V through a regulator 51, and then supplies the converted standby power P3.3V_DUAL of 3.3V to the system memory 20. When the system is in a normal state, the switching circuit 50 supplies the 3.3V main power P3.3V as the power P3.3V_DUAL to the system memory 20. Also, when the computer system is in the S5 state, or soft off state, the switching circuit 50 cuts off the 3.3V dual power P3.3V_DUAL supplied to the system memory 20. The switching circuit 50 is selectively controlled by the corresponding system state display signals S3# and S5# output from the power management controller 30.

Figure 2:
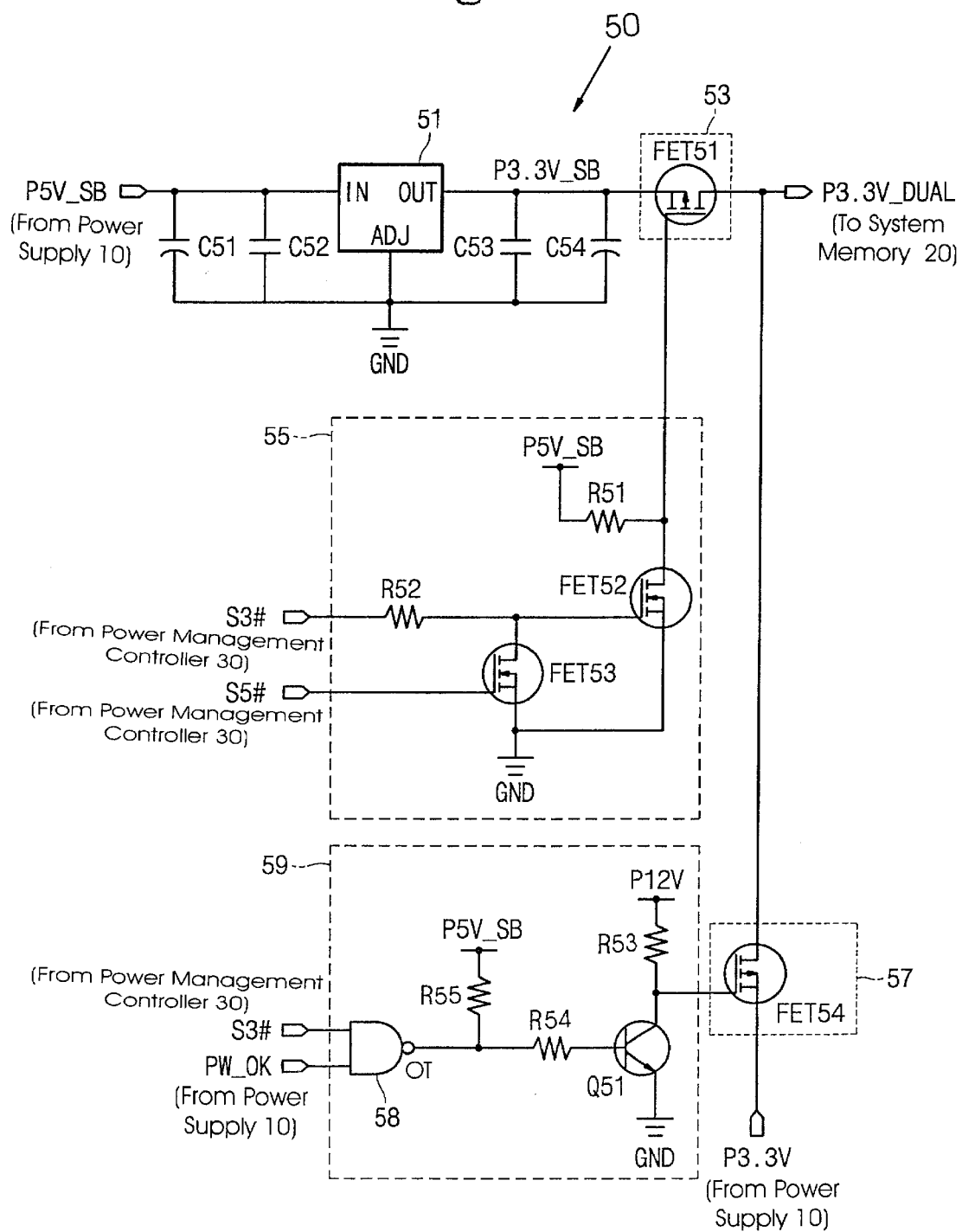
FIG. 2 is a detailed circuit diagram of a switching circuit shown in FIG. 1.

Referring now to FIG. 2, as well as to FIG. 1, FIG. 2 is a detailed circuit diagram of the switching circuit 50 shown in FIG. 1. As illustrated in FIG. 2, the switching circuit 50 includes the regulator 51, a first switch 53, a first switch driver 55, a second switch 57, and a second switch driver 59. Capacitors C51 and C52 are connected between an input terminal IN of the regulator 51 and a ground voltage GND. Capacitors C53 and C54 are connected between an output terminal OUT of the regulator 51 and the ground voltage GND. The regulator 51 receives 5V standby power P5V_SB supplied from the power supply 10, and then outputs 3.3V standby voltage P3.3V_SB to the first switch 53. The first switch 53 is connected between the regulator 51 and the system memory 20. The first switch driver 55 selectively controls the switching on and off of the first switch 53. As can be seen in FIG. 2, the first switch 53 and the second switch 57 are preferably implemented with field effect transistors FET51 and FET54, respectively.

Continuing with reference to FIG. 2, when the first switch 53 is switched on, the 3.3V standby power P3.3V_SB supplied from the regulator 51 is supplied to the system memory 20 through the first switch 53. Also, the second switch 57 is connected between the power supply 10 and the system memory 20. The second switch driver 59 selectively controls the switching on and off of the second switch 57. When the second switch 57 is switched on, the 3.3V main power P3.3V supplied from the power supply 10 is supplied to the system memory 20 through the second switch 57.

The first switch driver 55 includes a first field effect transistor FET52 and a second field effect transistor FET53, and a first resistor R51 and a second resistor R52. A drain of the first field effect transistor FET52 is coupled to a gate of the field effect transistor FET51 of the first switch 53 and is also connected to 5V standby power P5V_SB from the power supply 10 via the first resistor R51. A source of the first field effect transistor FET52 is coupled to the ground voltage GND, and a gate of the first field effect transistor FET52 is connected to receive a system state display signal S3# from the power management controller 30. A drain of the second field effect transistor FET53 is connected to the gate of the first field effect transistor FET52, and a source of the transistor FET53 is coupled to the ground voltage GND. Also, a gate of the second field effect transistor FET53 is coupled to a system state display signal S5# from the power management controller 30.

Also, referring to FIG. 2, the second switch driver 59 includes a logic circuit 58, a first resistor R53, a second resistor R54 and a third resistor R55, and also includes an NPN transistor Q51. A collector of the NPN transistor Q51 is coupled to a gate of the field effect transistor FET54 of the second switch 57 and is also connected to 12V main power P12V from the power supply 10 via the first resistor R53. An emitter of the NPN transistor Q51 is coupled to the ground voltage GND, and a base of the NPN transistor Q51 is connected to an output terminal OT of the logic circuit 58 via the second resistor R54. The logic circuit 58 includes a NAND circuit, for example. The logic circuit 58 selectively receives a system state display signal S3# from the power management controller 30 and selectively receives the power good signal PW_OK from the power supply 10, and the logic circuit 58 then outputs a NAND operation result corresponding to the received signals. The output OT of the logic circuit 58 is connected to the base of the transistor Q51 via the second resistor R54, and the output OT of the logic circuit 58 is also connected to the 5V standby voltage P5V_SB from the power supply 10 via the third resistor 55.

The following TABLE 1 illustrates an interrelationship between the system state display signals S3# and S5# output from the power management controller 30 when a computer system is in a normal operation state or working state, in the S3 state, and in the S5 state.

TABLE 1

| System State | Normal State | S3 State | S5 State |
|---|---|---|---|
| S3# | 0 | 0 | 0 |
| S5# | 0 | 1 | 0 |

As shown in TABLE 1, when a computer system is in the normal state, the system state display signals S3# and S5# each have a low level, respectively. Thus, the first switch driver 55 switches off the first switch 53. If the power good signal PW_OK has a high level, then the second switch driver 59 switches on the second switch 57. Accordingly, the system memory 20 receives 3.3V main power P3.3V from the power supply 10 when the system is in the normal state. When the computer system is in the S3 state, the system state display signal S3# has a low level and the system state display signal S5# has a high level. Thus, the first switch driver 55 switches on the first switch 53 and the second switch driver 59 switches off the second switch 57. Accordingly, the system memory 20 receives the 3.3V standby power P3.3V_SB from the regulator 51 when the computer system is in the S3 state. Also, when the computer system is in the S5 state, the system state display signals S3# and S5# each have a low level, respectively. Thus, the first switch driver 55 switches off the first switch 53, and the second switch driver 59 switches off the second switch 57. Accordingly, the dual power P3.3V_DUAL supplied to the system memory 20 is cut off when the system is in the S5 state.

As mentioned above, when a computer system supporting the ACPI power management scheme is in the S5 state, standby power supplied to a system memory for the computer system is cut off. Therefore, damage to the system memory and to peripheral circuits can be prevented when the system memory is removed or mounted from or upon a main board for the computer system. Moreover, power supplied to the system memory for the computer system in the S5 state is cut off to suppress unnecessary power consumption by the computer system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A power supply control circuit for a computer system, the computer system having a plurality of power management states including a normal state, a sleep state, and a power-off state, comprising:

a power supply for supplying main power and standby power for the computer system;

a power management controller for selectively controlling the power supply and for selectively outputting a plurality of system state display signals according to respective corresponding power management states, the power management controller being operated by receiving the standby power from the power supply; and a switching circuit coupled to the power management controller, the switching circuit selectively receiving the main power and the standby power from the power supply, the switching circuit supplying the main power to a volatile system memory of the computer system when each system state display signal of the plurality of system state display signals received from the power management controller is at a level corresponding to the normal state and when a power good signal is received from the power supply, the switching circuit supplying the standby power to the volatile system memory of the computer system when each system state display signal of the plurality of system state display signals received from the power management controller is at a level corresponding to the sleep state, and the switching circuit cutting off the standby power supplied to the volatile system memory of the computer system when each system state display signal of the plurality of system state display signals received from the power management controller is at a level corresponding to the power-off state.

2. The power supply control circuit of claim 1, a system context being stored and held in the volatile system memory of the computer system in the sleep state.

3. The power supply control circuit of claim 1, the switching circuit comprising:

a first switch positioned between the power supply and the volatile system memory of the computer system for receiving the standby power from the power supply;

a second switch positioned between the power supply and the volatile system memory of the computer system for receiving the main power from the power supply; and a switch driver for receiving each system state display signal of the plurality of system state display signals and the power good signal from the power supply, the switch driver switching on the second switch when each system state display signal of the plurality of system state display signals received is at a level corresponding to the normal state and when the power good signal is received, the switch driver switching on the first switch when each system state display signal of the plurality of system state display signals received is at a level corresponding to the sleep state, and the switch driver switching off the first switch and the second switch when each corresponding system state display signal of the plurality of system state display signals received is at a level corresponding to the power-off state.

4. The power supply control circuit of claim 3, further comprising a regulator for adjusting a level of the standby power, the regulator being positioned between the power supply and the first switch of the switching circuit.

5. The power supply control circuit of claim 4, the switch driver including a first switch driver for selectively controlling on and off states of the first switch and a second switch driver for selectively controlling on and off states of the second switch.

6. The power supply control circuit of claim 4, the switching circuit including the regulator for adjusting the level of the standby power.

7. The power supply control circuit of claim 3, the switching circuit including a regulator for adjusting a level of the standby power.

8. The power supply control circuit of claim 3, the switch driver including a first switch driver for selectively controlling on and off states of the first switch and a second switch driver for selectively controlling on and off states of the second switch.

9. The power supply control circuit of claim 8, the switching circuit including a regulator for adjusting a level of the standby power.

10. A power supply control circuit for a computer system, the computer system having a plurality of power management states including a normal state, a sleep state, and a power-off state, said circuit comprising:

a power management controller for selectively controlling a power supply of the computer system and for selectively outputting a plurality of system state display signals according to respective corresponding power management states to control the power supply of the computer system; and a switching circuit coupled to the power management controller, the switching circuit supplying a main power to a volatile system memory of the computer system when each system state display signal of the plurality of system state display signals received from the power management controller is at a level corresponding to the normal state and when a power good signal is received from the power supply, the switching circuit supplying standby power to the volatile system memory of the computer system when each system state display signal of the plurality of system state display signals received from the power management controller is at a level corresponding to the sleep state, and the switching circuit cutting off the standby power supplied to the volatile system memory of the computer system when each system state display signal of the plurality of system state display signals received from the power management controller is at a level corresponding to the power-off state.

11. The power supply control circuit of claim 10, a system context being stored and held in the volatile system memory of the computer system in the sleep state.

12. The power supply control circuit of claim 10, the switching circuit comprising:

a first switch for controlling the standby power;

a second switch for controlling the main power; and a switch driver for receiving each system state display signal of the plurality of system state display signals and the power good signal from the power supply, the switch driver switching on the second switch to provide main power when each system state display signal of the plurality of system state display signals received is at a level corresponding to the normal state and when the power good signal is received, the switch driver switching on the first switch to provide the standby power when each system state display signal of the plurality of system state display signals received is at a level corresponding to the sleep state, and the switch driver switching off the first switch and the second switch when each system state display signal of the plurality of system state display signals received is at a level corresponding the power-off state.

13. The power supply control circuit of claim 12, the switching circuit including a regulator for adjusting a level of the standby power.

14. The power supply control circuit of claim 13, the switch driver including a first switch driver for selectively controlling on and off states of the first switch and a second switch driver for selectively controlling on and off states of the second switch.

15. The power supply control circuit of claim 12, the switch driver including a first switch driver for selectively controlling on and off states of the first switch and a second switch driver for selectively controlling on and off states of the second switch.

16. The power supply control circuit of claim 10, the switching circuit including a regulator for adjusting a level of the standby power.

17. A method of controlling a power supply of a computer system, the computer system having a plurality of power management states including a normal state, a sleep state, and a power-off state, said method comprising the steps of:

selectively controlling the power supply of the computer system by means of a power management controller which selectively outputs a plurality of system state display signals according to respective corresponding power management states;

selectively providing main power to a volatile system memory of the computer system by means of a switching circuit when each system state display signal of the plurality of system state display signals received by the switching circuit from the power management controller is at a level corresponding to the normal state and when a power good signal is received from the power supply;

selectively supplying, by means of the switching circuit, standby power to the volatile system memory of the computer system when each system state display signal of the plurality system state display signals received by the switching circuit from the power management controller is at a level corresponding to the sleep state; and selectively cutting off, by means of the switching circuits the standby power to the volatile system memory of the computer system when each system state display signal of the plurality of system state display signals received by the switching circuit from the power management controller is at a level corresponding to the power-off state.

18. The method of claim 17, further comprising the step of adjusting a level of the standby power received by the switching circuit by means of a regulator.

* * * * *